(12) United States Patent
Couture

(10) Patent No.: US 6,486,569 B2
(45) Date of Patent: Nov. 26, 2002

(54) POWER FLOW MANAGEMENT IN AN ELECTRIC POWER GRID

(75) Inventor: Pierre Couture, Boucherville (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/881,206

(22) Filed: Jun. 15, 2001

(65) Prior Publication Data

US 2002/0005668 A1 Jan. 17, 2002

Related U.S. Application Data

(63) Continuation-in-part of application No. 09/453,400, filed on Dec. 3, 1999.

(30) Foreign Application Priority Data

Dec. 4, 1998 (CA) .............................................. 2253762

(51) Int. Cl.[7] ................................................ H05B 1/02
(52) U.S. Cl. ....................... 307/98; 307/125; 307/147; 307/112; 307/113; 307/116; 307/126; 219/501
(58) Field of Search ................................. 307/125, 113, 307/116, 126, 147, 112, 98; 219/501

(56) References Cited

U.S. PATENT DOCUMENTS 6,018,152 A 2/2000 Allaire et al.

FOREIGN PATENT DOCUMENTS

GB 2324417 * 10/1998

* cited by examiner

*Primary Examiner*—Josie Ballato
*Assistant Examiner*—Robert L. Deberadinis
(74) *Attorney, Agent, or Firm*—Foley & Lardner

(57) ABSTRACT

Power flow management is achieved in an electrical power transmission network using serial impedance modulation distributed throughout the transmission lines of the network. Switching units are mounted to insulated portions of transmission line towers in proximity to phase lines for modulating power flowing in at least one phase line conductor of at least one bundle conductor phase line in an electric power transmission line at a plurality of segments in the network. Power flow is managed in at the segments by changing the series impedance of the line by controlling the switching units. Enhanced insulation between phase line conductors is added. The power flow in a plurality of electric power lines of the network is analyzed, a desired change in impedance for the electric power lines is determined, and at least some of the switching units are controlled to implement the desired change in impedance.

19 Claims, 13 Drawing Sheets

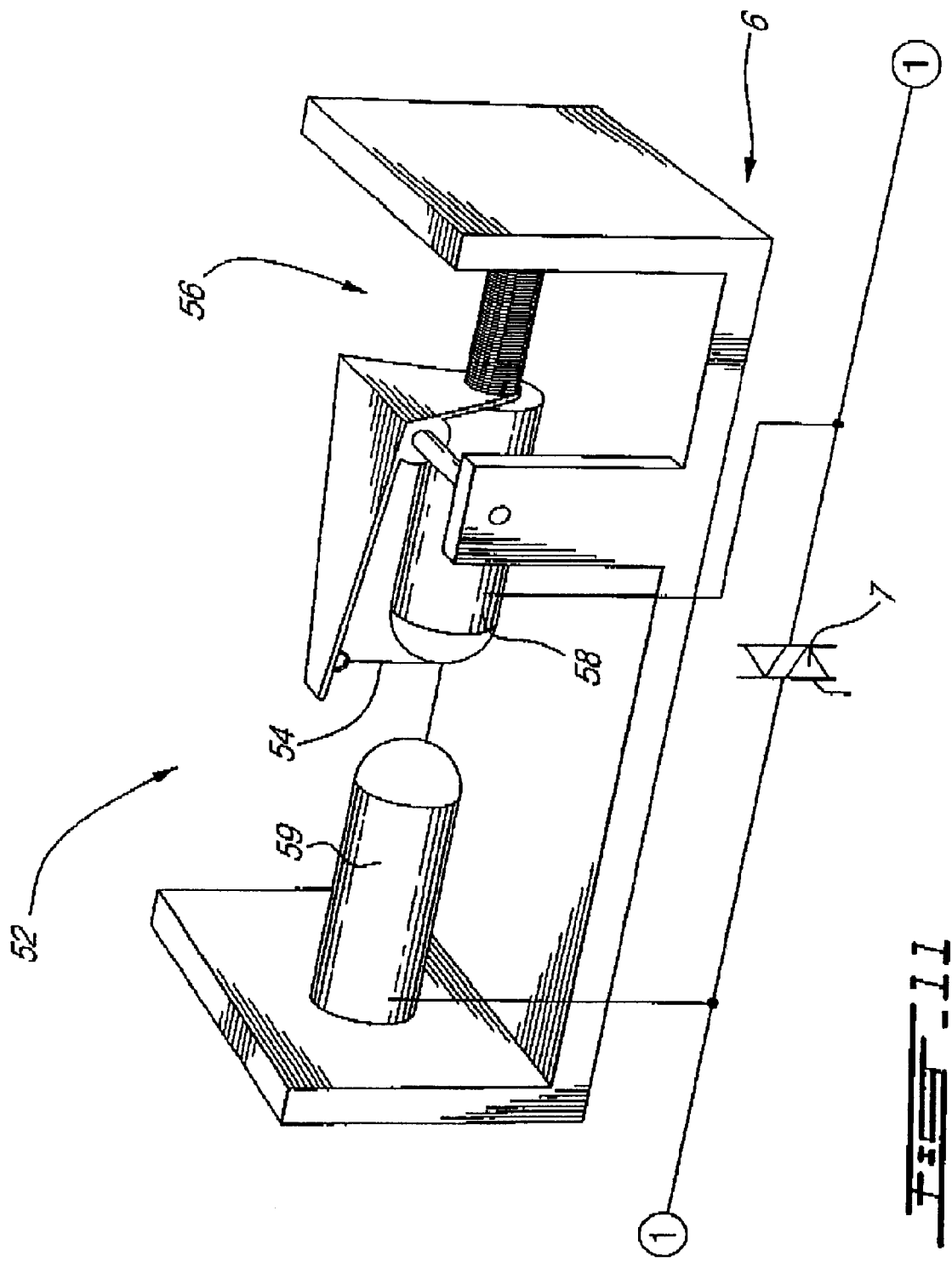

POWER MODIFYING
CAPACITOR

6,486,569 B2

POWER FLOW MANAGEMENT IN AN ELECTRIC POWER GRID

CROSS-REFERENCE TO RELATED APPLICATIONS

The present application is a continuation-in-part of U.S. patent application Ser. No. 09/453,400 filed Dec. 3, 1999, now pending, the specification of which is hereby incorporated by reference. This application is also related to co-pending PCT patent application PCT/CA00/01348 filed Nov. 14, 2000, designating the United States, the specification of which is also hereby incorporated by reference.

FIELD OF THE INVENTION

The present invention relates to a method and system for managing power flow in an electric power network or grid. More specifically, the invention relates to the implementation of switching apparatus for a segment of a bundle conductor electric power line in a network or grid, with the switching apparatus being distributed throughout the grid and controlled in a manner to manage power flow. In the following text, we will refer to "phase line" to describe what is usually known by a person skilled in the art as "phase". The system and method can thus be used for modifying, in a static or dynamic manner, the power flow through an electric power line.

BACKGROUND OF THE INVENTION

Power flow in an electric power transmission grid is difficult to manage. Power is transmitted over transmission lines from power sources, i.e. generating plants, to loads over great distances. In a typical network, power flows over multiple paths to any given load. Each transmission line has a maximum flow capacity at which: 1) an accident causing loss of the line would not disrupt the grid stability; and 2) the thermal limit of network components, such as transformer and transmission line components, are respected. Maintaining power flow within safe and stable limits on each transmission line while meeting the demands at loads at a variety of geographically distinct locations is an art. Power will flow in a network along the paths of least impedance, and typically, as there is an increase in demand at a point in the network or a change in network topology due to a loss of a transmission line, the natural change in power flow in the transmission lines of the network does not favor stability or operating within safe thermal limits. In response to such a change in the network, administrators of the network typically control power flow by adjusting, where possible, loads or power injected by generators, and, during extreme conditions, the removal or insertion of transmission lines, all according to the geography and topology of the network. To ensure safe operation and/or stability of the network as a result of a sudden change, the maximum flow capacity of transmission lines are set within very conservative, albeit necessary, values. This reduces the practical transmission capacity of the network and requires installation of more transmission lines.

In more recent years, the challenges of power flow management in electrical transmission grids in the United States have significantly increased due to integration of power systems across ever increasing regions of the US. Changes in demand for power at different points in the grid can cause very complex problems. These problems can result in grid congestion, the consequences of which include price spikes, load dropping, and if these measures do not suffice, loss of power distribution to one or more areas. As mentioned above, changes in demand and/or source, or the loss of a transmission line generally do not favor network stability. Managing such changes by source/load adjustment is awkward. To improve power flow management, devices known as flexible AC transmission systems (FACTS) have been proposed. These devices include phase-shifting transformers, impedance modulators, series compensation capacitors, and the like, that are installed at transmission line stations to adjust power flow in each transmission line, so that power can be guided to flow in a safe, stable and balanced manner in the large number of lines within the network.

FACTS are usually referenced electrically with respect to ground. Due to the transmission line voltages in the range of 100 to 800 kV, the cost of such devices is very high. FACTS require the addition of new components for providing the power flow control without exploiting the properties of existing network components.

Unfortunately, FACTS are not widely implemented in power distribution networks in the US, in such a way that would allow power flow management to be made easier. The small amount of power being adjusted in each transmission line is nevertheless a significant quantity of power to be handled by a device inserted into a transmission line. Due to the power involved and the fact that devices are ground referenced, the cost of such FACTS is not negligible.

SUMMARY OF THE INVENTION

It is a first object of the present invention to provide a method and system for power flow management in an electric power network or grid that use devices to modulate the impedance or to implement any other FACT-related function of phase lines in bundled conductor transmission line segments in the network in a manner which exploits the characteristics of bundle conductors and operates on the transmission line with no ground reference. The invention may thus provide a low-cost FACTS.

It is a second object to provide a method and system for power flow management in an electric power network or grid, in which a number of phase line impedance modulating devices are distributed over the transmission line at various segments.

It is a third object to provide a method and system for power flow management in an electric power network or grid, in which a number of bundle conductor impedance modulating (or other FACT-related function) devices are remotely controlled by telecommunications.

It is a fourth object to provide a method and system for power flow management in an electric power network or grid, in which a number of impedance modulating devices are provided in a number of transmission lines within the network.

It is a fifth object to provide a method and system for power flow management in an electric power network or grid, in which a number of phase line impedance modulating devices modulate either real or reactive power flow, or both, in the phase lines.

It is a sixth object to provide a method and system for power flow management in an electric power network or grid, in which a number of transmission line impedance modulating devices operate without having an electrical reference to the ground.

It is a seventh object to provide a method and system for power flow management in an electric power network or grid, in which a number of phase line impedance modulating devices modulate only the impedance of some but not all phase line bundle conductors, and electronic switches are used for switching modulated phase line conductors.

It is an eighth object to provide a method and system for power flow management in an electric power network or grid, in which a number of phase line impedance modulating devices are mounted on an insulated portion of at least one transmission tower of the transmission line. In lines requiring greater impedance control, a number of devices may be installed at a number of towers along the transmission line. Advantageously, impedance modulating circuit elements, such as resistors or capacitors may be mounted within the volume defined by four phase line conductors of the phase lines.

It is a ninth object to provide a method and system for de-icing bundle conductor power transmission lines. Preferably, when in the process of de-icing, the system is used to concentrate power flow in transmission lines where de-icing is underway.

It is a tenth object of the invention to provide a method and system for power flow management in an electric power network or grid, in which at least one line impedance modulating device is mounted on an insulated portion of at least one transmission tower of the transmission line. In the case of polyphase lines, the device can adjust impedance between phases.

According to a broad aspect of the invention, there is provided a method of power flow management in an electrical power distribution network, the method comprising steps of: providing at least one switching unit mounted to insulated portions of transmission line towers in proximity to at least one bundle conductor for opening and closing a current path in at least one of a plurality of conductors of the bundle to cause an impedance change modulating power flowing in at least one conductor of the at least one bundle conductor in an electric power transmission line at one or more segments in the network; providing insulation between the conductors of the bundle so as to be able to withstand a voltage difference between the conductors caused by the switching unit in the segments; and managing the power flow in the segments by changing the series impedance of the line by controlling the at least one switching unit.

While some conventional bundle conductor spacers have a rubber sleeve between the spacers and the conductors, which sleeve can provide adequate insulation for up to a few hundred volts, it is preferred that conventional spacers are replaced by insulating spacers. With better insulating spacers, spans may reach 20 to 50 km. Most yokes are not insulating by design. As with spacers, yokes must be insulating in the present invention, therefore, yokes are replaced by insulating yokes.

While most segments will span about 10 to 50 km, the present invention can be applied to provide a current limiting FACTS, in which case a shorter span of a few kilometers is sufficient. A current limiter can also detect when a current threshold is exceeded using a local detector and provide local automatic of the switching unit.

The step of managing may comprise analyzing power flow in a plurality of electric power lines of the network, determining a desired change in impedance for at least one of the plurality of electric power lines of the network, and controlling at least some of the switching units to implement the desired change in impedance.

The step of controlling may comprises transmitting a control signal to the switching units via a communications network, which may be wired or wireless.

The control signal may comprise a plurality of switching units commands addressed to specific ones of the switching units, the step of determining comprising selecting a combination of switching units and impedance change values expected to result in the desired change.

The series impedance change may be a variable increase in impedance caused by opening one or more of the at least one phase line conductor, the combination of switching units and impedance change values being selected to reduce excess joule heating at points in the phase line.

The combination of switching units and impedance change values may be changed periodically to yield the same desired impedance change while allowing phase line conductors to cool.

The series impedance change may be a variable increase in impedance caused by opening one or more of the at least one phase line conductor. One phase line conductor may permanently left unswitched so as to conduct, or the switching units may comprise electromechanical switching units having a plurality of switching states that prevent an open circuit as the switching states are changes.

The switching units are preferably provided at an insulated portion of transmission towers in two groups for modulating impedance of two successive segments from each tower.

The switching units may be provided at transmission towers in two groups for modulating impedance of two the segments from each tower, the two groups of switching units sharing a same communications interface. The control signal may be transmitted to communications interfaces at the towers, the communications interfaces communicating in turn with the switching units via a local wireless communications interface.

BRIEF DESCRIPTION OF THE DRAWINGS

The invention will be better understood by way of the following detailed description of a preferred embodiment with reference to the appended drawings, in which:

FIG. 11 is a schematic diagram circuit of an electronic switch and an open circuit protective element connected in parallel according to the preferred embodiment.

DETAILED DESCRIPTION OF THE PREFERRED EMBODIMENT

Figure 1:
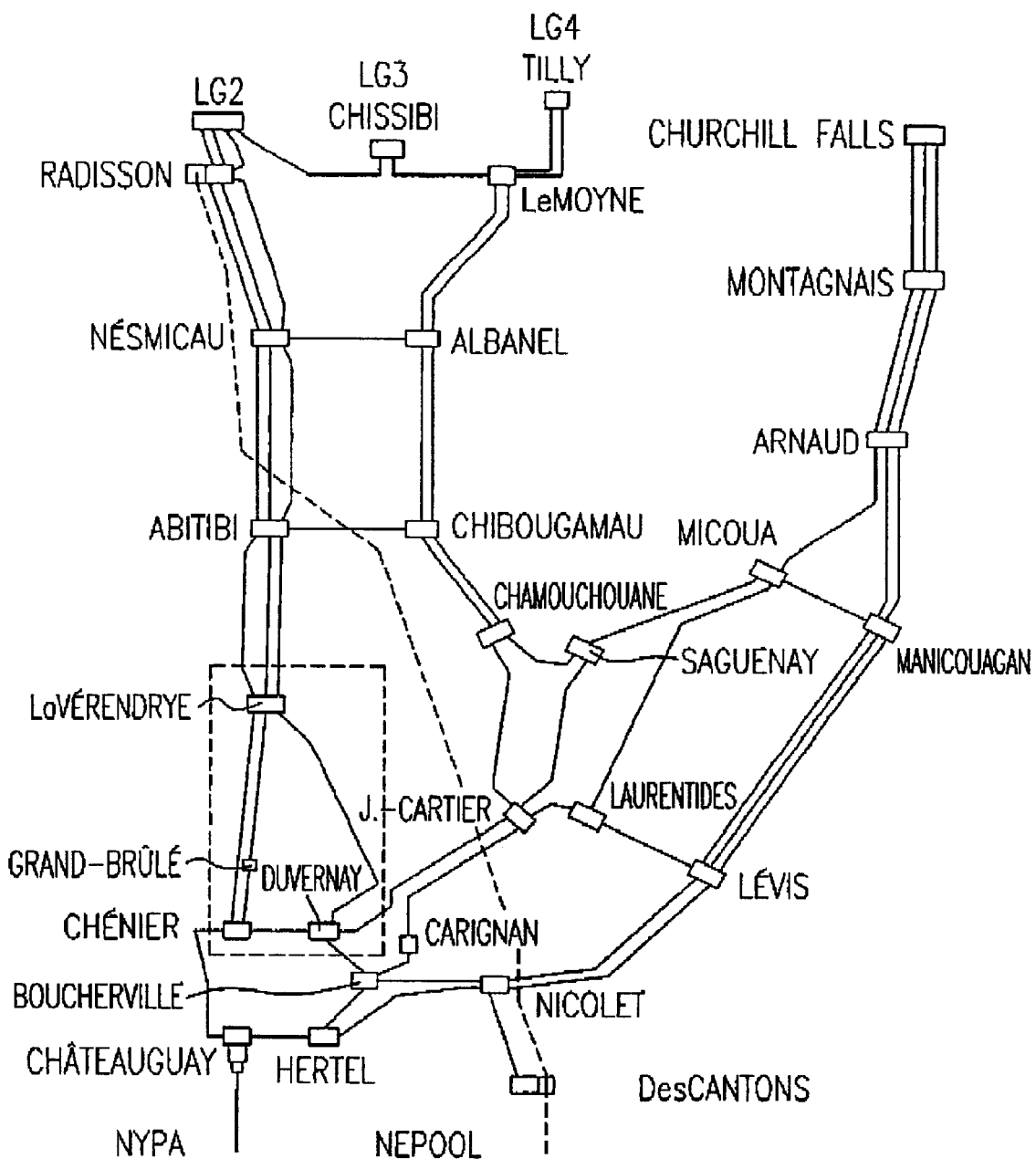
FIG. 1 is a schematic diagram showing as an example the 735 kV AC electric power transmission network in Quebec.

In the following description, the same reference numerals refer to similar elements.

For a high-voltage electric power line, usually there are used for each phase line several conductors for reducing the losses by the crown effect. Each phase line is mounted using insulators to the transmission towers, and a yoke plate holds the phase line conductors separated from and parallel to each other. The phase lines are insulated to withstand the high voltage, which is typically 735 kV for long distance AC power lines. The invention can operate with any bundled conductor transmission line, either DC or AC, and in the case of AC, either single, dual or polyphase. For example, the invention may be applied to 315 kVAC, 345 kVAC, 400 kVDC, 500 kVAC, 735 kVAC and 765 kVAC lines. The power is thus transmitted from generators to power stations to loads using an interconnected network of transmission lines, as illustrated in FIG. 1. Because the impedance modulation is carried out within the bundled conductor line at a position insulated from ground, switching components are exposed to less than about 10 kV, rather than hundreds of kV, and this contributes fundamentally to reducing the cost of the system. It is believed that the present invention can provide a FACTS at a cost much lower than the cost of conventional ground referenced FACTS installed at power stations. A further advantage of the FACTS according to the invention is that the device is accommodated on transmission towers directly without requiring installation space at power stations or elsewhere on the ground.

In the case of DC transmission lines, the invention can be used for filtering the line and/or de-icing. In the case of filtering, current level fluctuations can be measured at the line by the switching unit, and the switching unit can operate to cancel oscillations.

Figure 2:
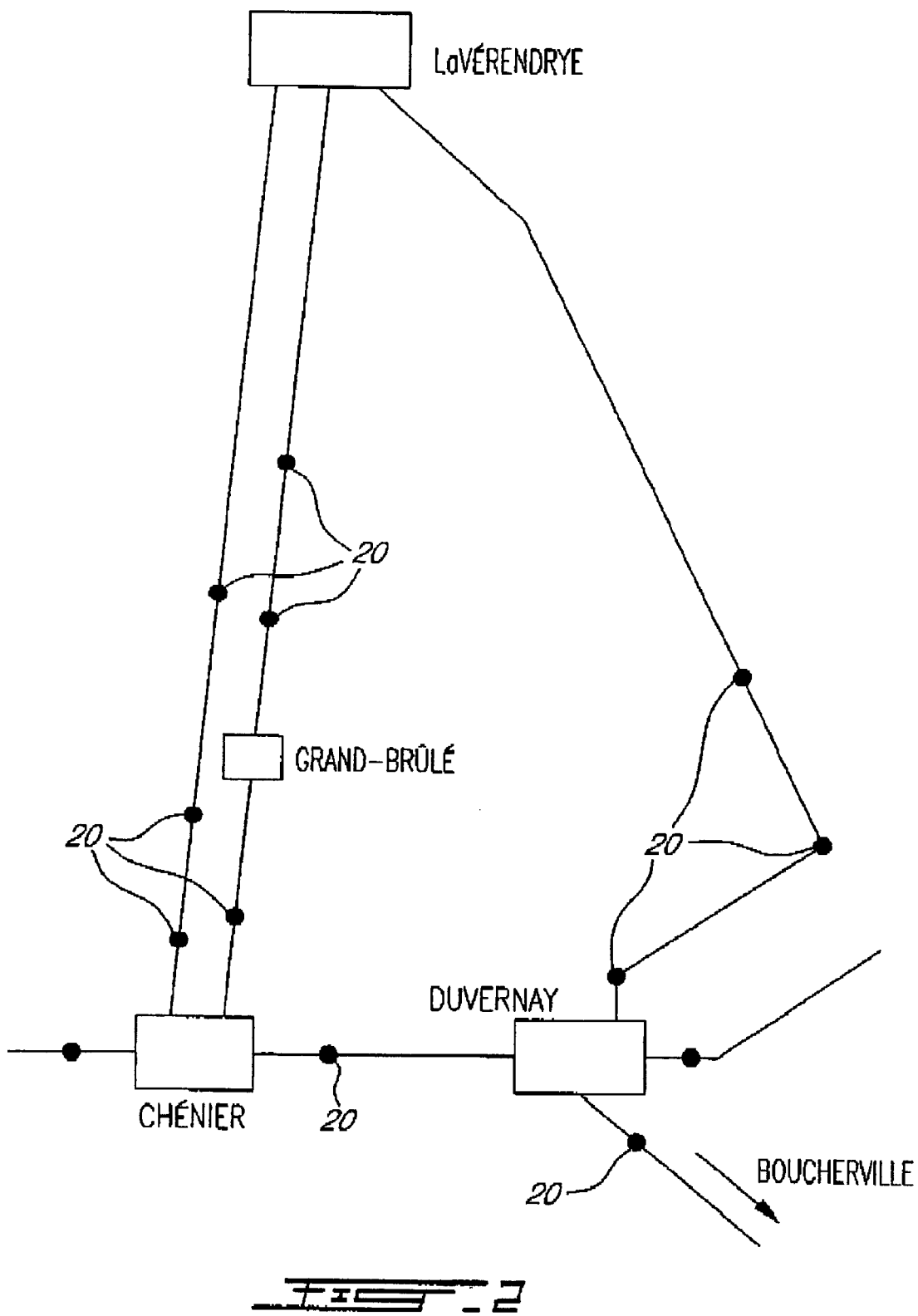
FIG. 2 is an expanded view of a portion of the example network illustrated in FIG. 1 having impedance modulating switching units according to the preferred embodiment distributed over the transmission lines at a number of segments thereof.

According to the invention, and as shown in FIG. 2, the impedance of at least one phase line is modulated by inserting into one or more of the transmission lines at one or more locations switching units 20 remotely controlled to modulate the impedance of the phase line as desired to effect power flow management in the network. As will be described in greater detail hereinbelow, the method of managing power flow according to the preferred embodiment involves installing switching units 20 at a number of locations on all three phases of a number of transmission lines in a network. Insulated yokes and insulating are installed in the segment whose impedance is modulated. Such installation can be done, either when repairing or upgrading, or when installing new transmission lines. The segment controlled can typically be as long as about 40 to 50 km.

Figure 3:
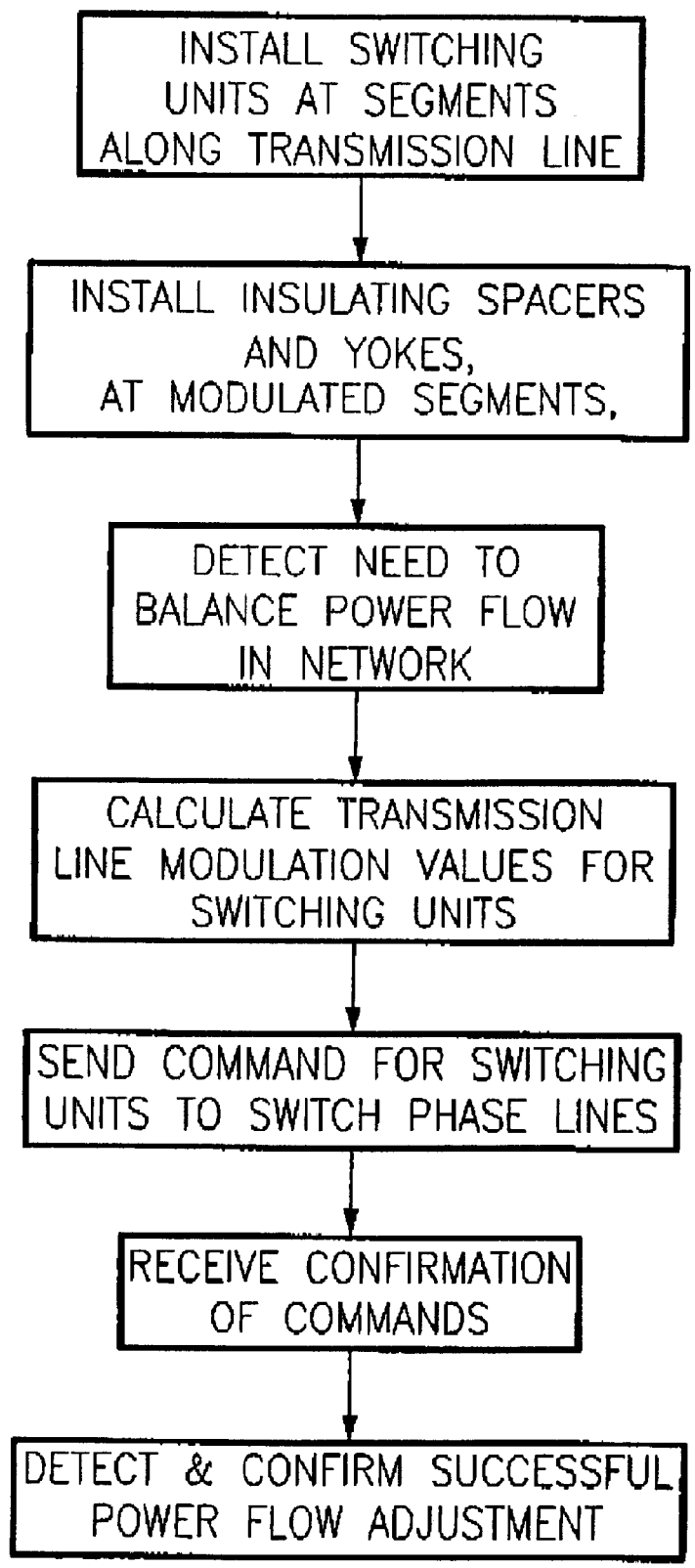
FIG. 3 is a flow chart illustrating steps involved in the method of power flow management according to the preferred embodiment.

As illustrated in FIG. 3, the method according to the preferred embodiment comprises detecting the need to balance power flow in the network. It will be apparent to those skilled in the art how such detection is implemented, and how to determine the desired phase line impedance modulation values in transmission lines within a network. Network administrators of power transmission networks typically understand their networks very well, and although traditional power flow management has been achieved by load balancing instead of transmission line impedance adjustment, the recent advent of FACTS have permitted, at least conceptually, for power flow management to be achieved.

Figure 4:
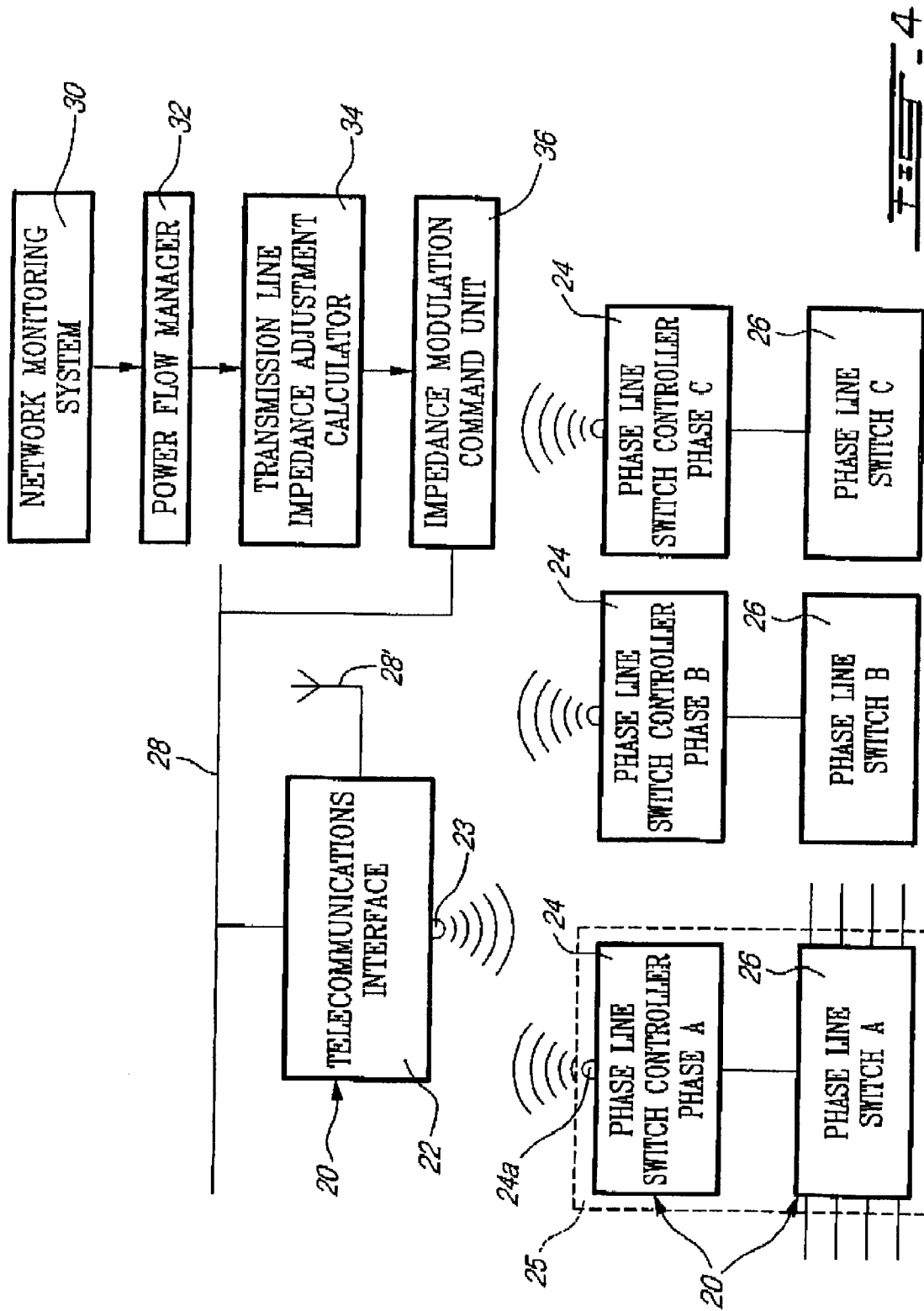
FIG. 4 is a schematic block diagram of a three-phase (A, B, C) phase line impedance modulation switching arrangement installed at one tower in a transmission line according to the preferred embodiment, in which the switching apparatus is not electrically referenced to ground.

According to the invention, control over the transmission line impedance is carried out using phase line conductor switching units that alter the real and/or reactive impedance of the phase line conductors at a number of distributed points along the transmission line. The impedance can thus either be increased or decreased. When a capacitor is switched to be in series with the line, the value of the capacitor will affect the impedance. At a particular value, the impedance will decrease, and deviations from this value will result in increased impedance. It will be appreciated that persons skilled in the art will choose suitable capacitor values for a particular transmission line to achieve the desired impedance modulation. Very small impedance adjustments can be achieved by small adjustments at a number of points or by larger adjustments at fewer points along the transmission line. While such adjustments can be carried out by on site control of the switching units, in the preferred embodiment, the control is done using telecommunications. As shown in FIG. 4, the system according to the preferred embodiment comprises a switching unit 20 including a telecommunications interface 22 connected to a wired network 28, for example associated with the transmission line, or a wireless communications device 28'. The interface 22 communicates in turn by wireless means 23 to the individual phase line conductor switch controllers 24 for each separate phase line. The controllers 24 each control a respective switching device 26 for the phase line conductors. The local wireless means 23 may be infrared, visible optical, ultrasound or RF, and is preferred over a wired or optical fiber connection since a wired connection requires greater insulation effort. RF is however preferred.

As further illustrated in FIG. 4, the system includes a network monitoring system 30 and a power flow management tool 32, as are known in the art. Preferably, the method includes an automatic calculation of which switching unit adjustments will achieve the desired impedance change in the transmission line is carried out, and an automatic communication of the series of commands to the number of switching units. This is achieved using a calculator 34 for calculating the desired transmission line phase adjustment, and a command unit 36 for automatically preparing and sending a series of commands to units 20, or more specifically units 22. Confirmation of the commands being received and executed can also be automatically processed by command unit 36 using feedback messages from interfaces 22. This will allow the network operator or administrator to detect and confirm that the power flow adjustment has been successful based on the actual power flow measurements collected from system 30.

While in the preferred embodiment all impedance adjustments are implemented using telecommunication means, it will be appreciated that adjustments may also be made "manually" by site inspections during which the switching devices are controlled on site. To avoid the need to take the line out of service, control of the switching units 25 is still preferably done by remote control.

Figure 5:
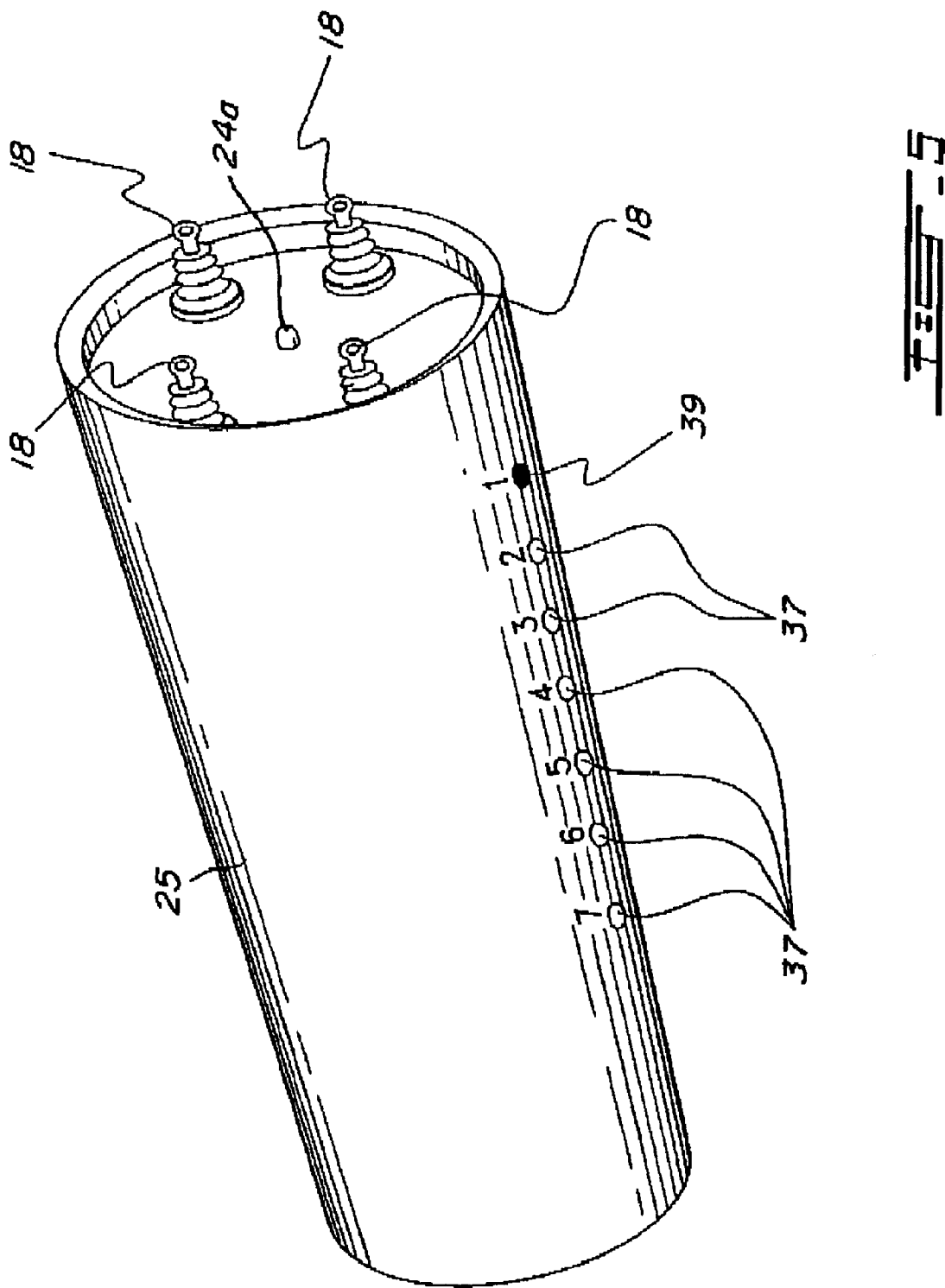
FIG. 5 is a perspective view of one of a phase line switching module according to the preferred embodiment.

Referring now to FIG. 5, one can see a perspective view of one of the modules 25 incorporating both the controller device 24 and the switching device 26. One can see the terminals 18 of the switching device, as well as the crossing insulators. One can also see the openings 37 as well as a bead or marble 39 which indicates the position of the mobile contacts for site inspection by a technician. The mobile contacts are part of a sliding contact electromechanical switch having 7 states, namely all conductor switches closed (1), only one closed for each conductor (2–5), and two different pairs of opposed conductors closed (6–7). With a mechanical slide switch as shown, no state is physically provided in which all conductor switches are open, which would expose the switching unit to the full 735 kV line voltage, and could cause a fire and/or fault. To prevent arcing and premature wearing out of the switching module, the electromechanical switches are coupled with electronic switches in parallel in order to make electronically the current before making mechanical contact, and to break electronically the current after breaking mechanical contact. Further details of the electromechanical switching device are disclosed in Applicant's copending application Ser. No. 09/453,400 filed Dec. 3, 1999.

It will be appreciated that only electronic switches can react in real time for immediate impedance modulation used for maintaining dynamic network stability. A real time network stability analyzer receiving actual sensor values of network operation may be used to calculate in real time a desired impedance change in a transmission line to ensure network safety (i.e. maintaining safe operating temperature for all components) or stability in response to a sudden change in the network, i.e. a sudden loss of a line in the network. The required switching unit 25 commands can be sent by telecommunications to the units in real time to effect the impedance change in the lines where needed.

Figure 6:
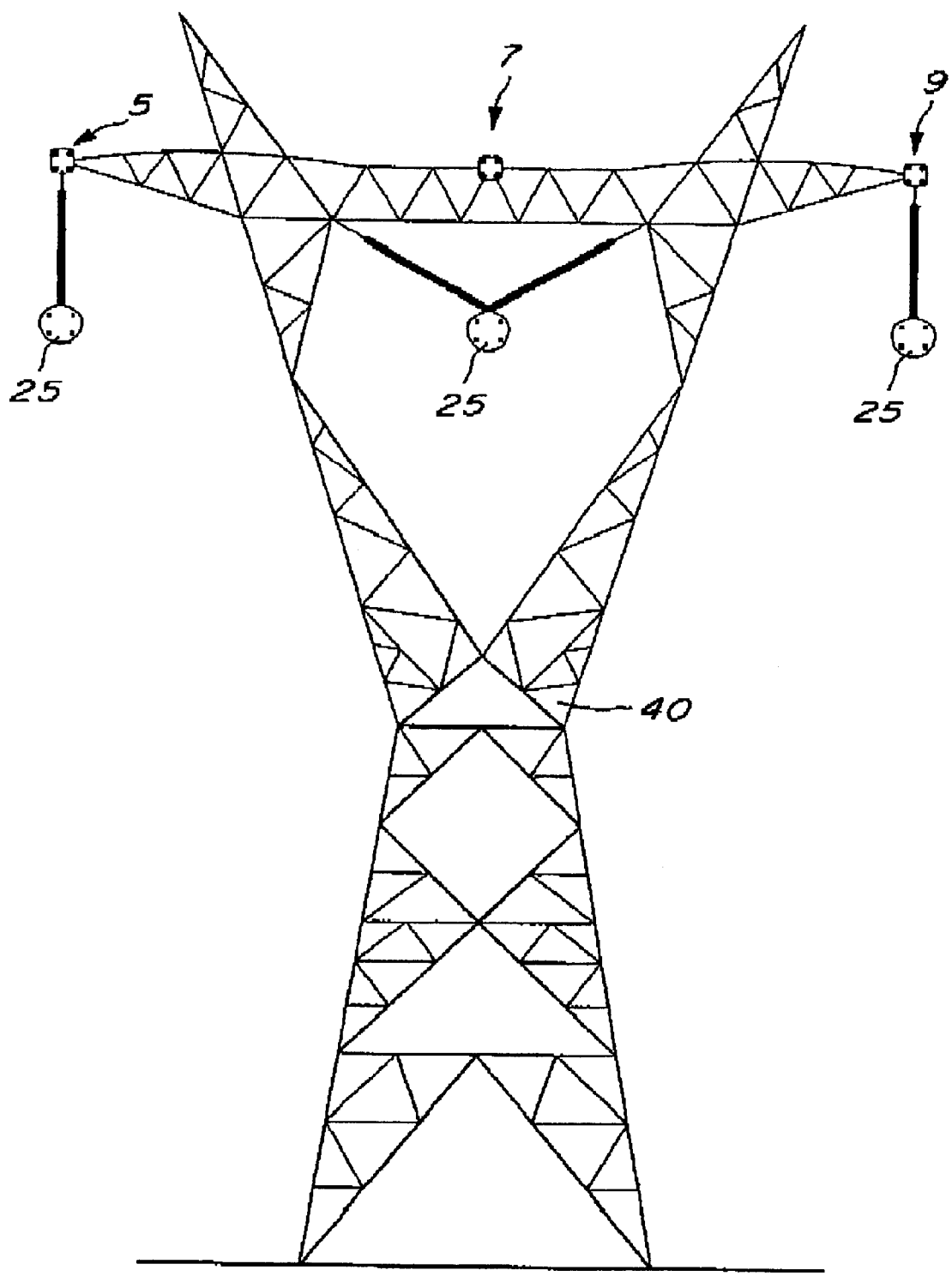
FIG. 6 is a front view of a transmission tower supporting an electric power line on which modules according to FIG. 5 are mounted.
Figure 7:
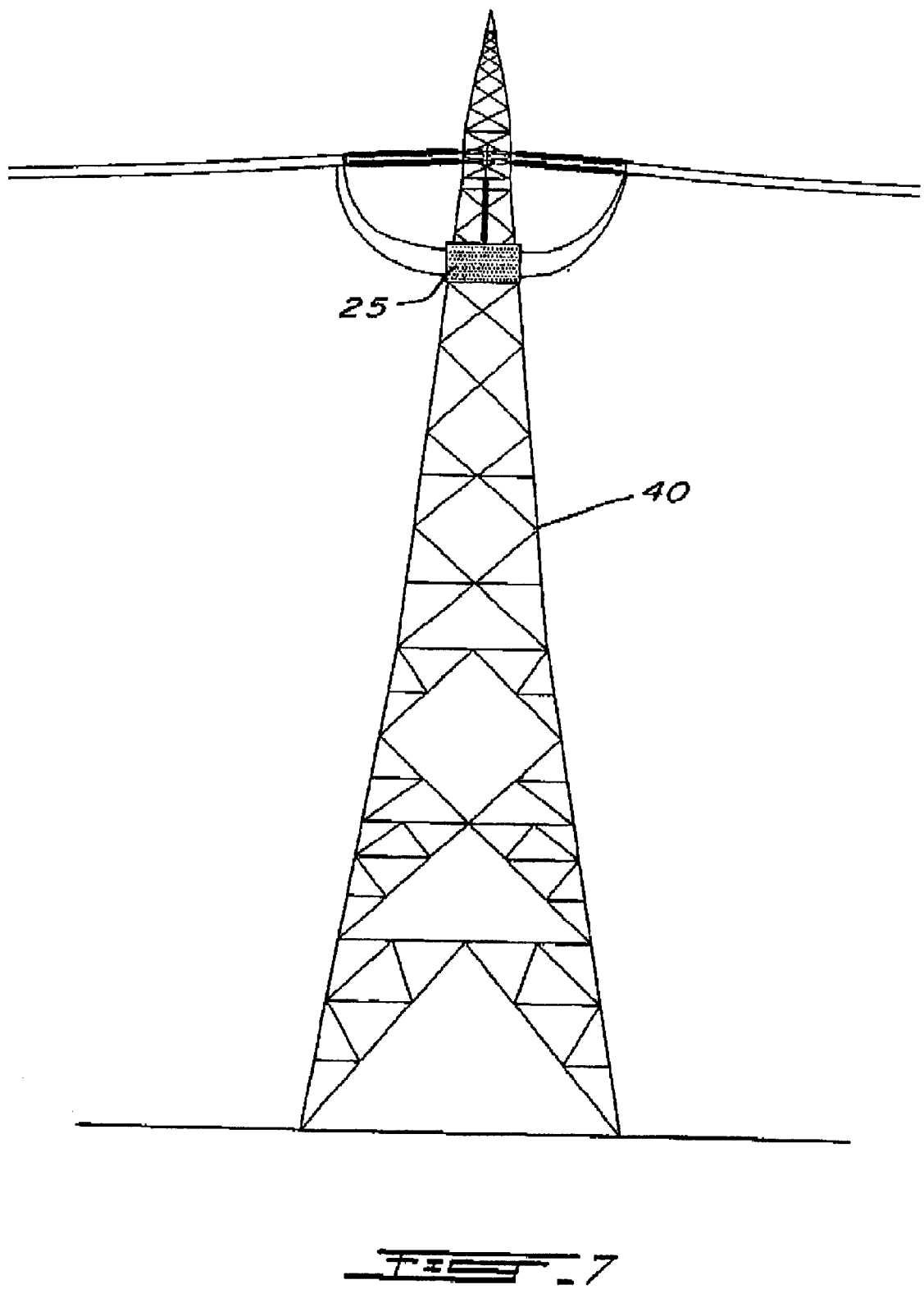
FIG. 7 is a side view of a transmission tower supporting an electric power line on which modules according to FIG. 5 are mounted.

FIGS. 6 and 7 illustrate the modules 25 mounted on a tower 40. The telecommunications interface 22 is also mounted to the tower 40, although not shown in FIGS. 6 and 7. The interface 22 may be mounted at any suitable position on the tower 40. A power supply device is provided for supplying the interface 22 which may comprise either a low voltage supply line provided on the transmission line or a battery and solar panel system. For the module 25, a separate power supply is provided which may include a similar battery and solar panel system and/or a power supply extracting power from the transmission line itself, either by inductive coupling or by extracting power when one of the phase line conductor switches is open.

Figure 8:
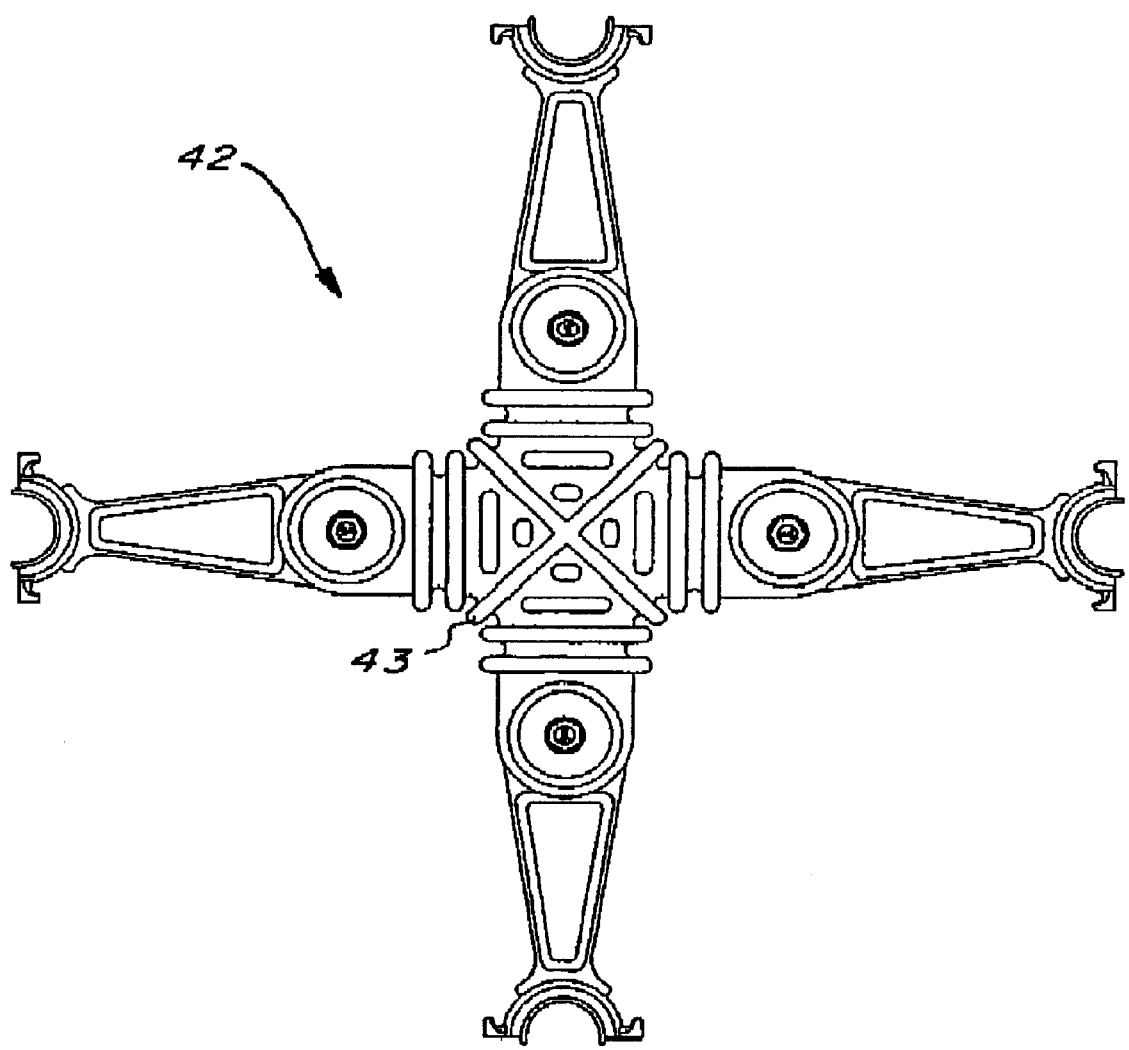
FIG. 8 is a front view of a four-conductor bundle spacer having a modified insulated central part for an application according to the preferred embodiment.
Figure 9:
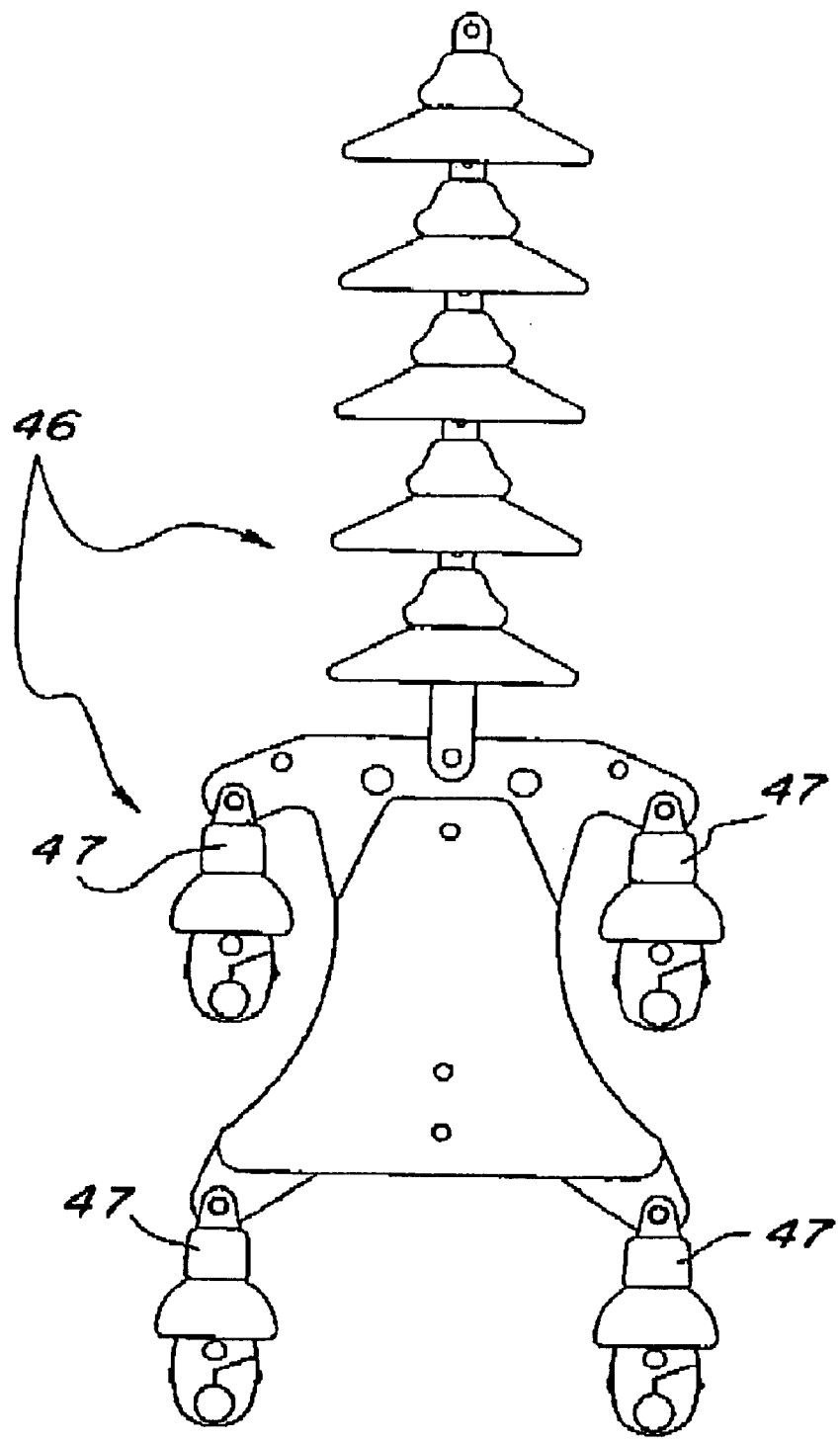
FIG. 9 is a front view of a yoke plate modified for an application according to the preferred embodiment.

FIG. 8 illustrates a spacer 42 where the insulating capacity thereof has been increased by making certain parts 43 with an insulating material such as, for example, a polymer or ceramic. Yoke plates like the one shown in FIG. 9 are mounted on the transmission towers and mechanically link the conductors to the insulators. FIG. 9 shows a front view of a yoke plate 46 where the pins that support the conductors have been insulated by making certain parts 47 with an insulating material such as, for example, a polymer or ceramic. It will be appreciated that by making the spacers 42 and yokes 46 more insulating, the phase line conductors may operate with a greater voltage difference between them, which allows fewer switching units 20 to be employed in the transmission line while providing the same impedance range control.

Figures 10A, 12A:
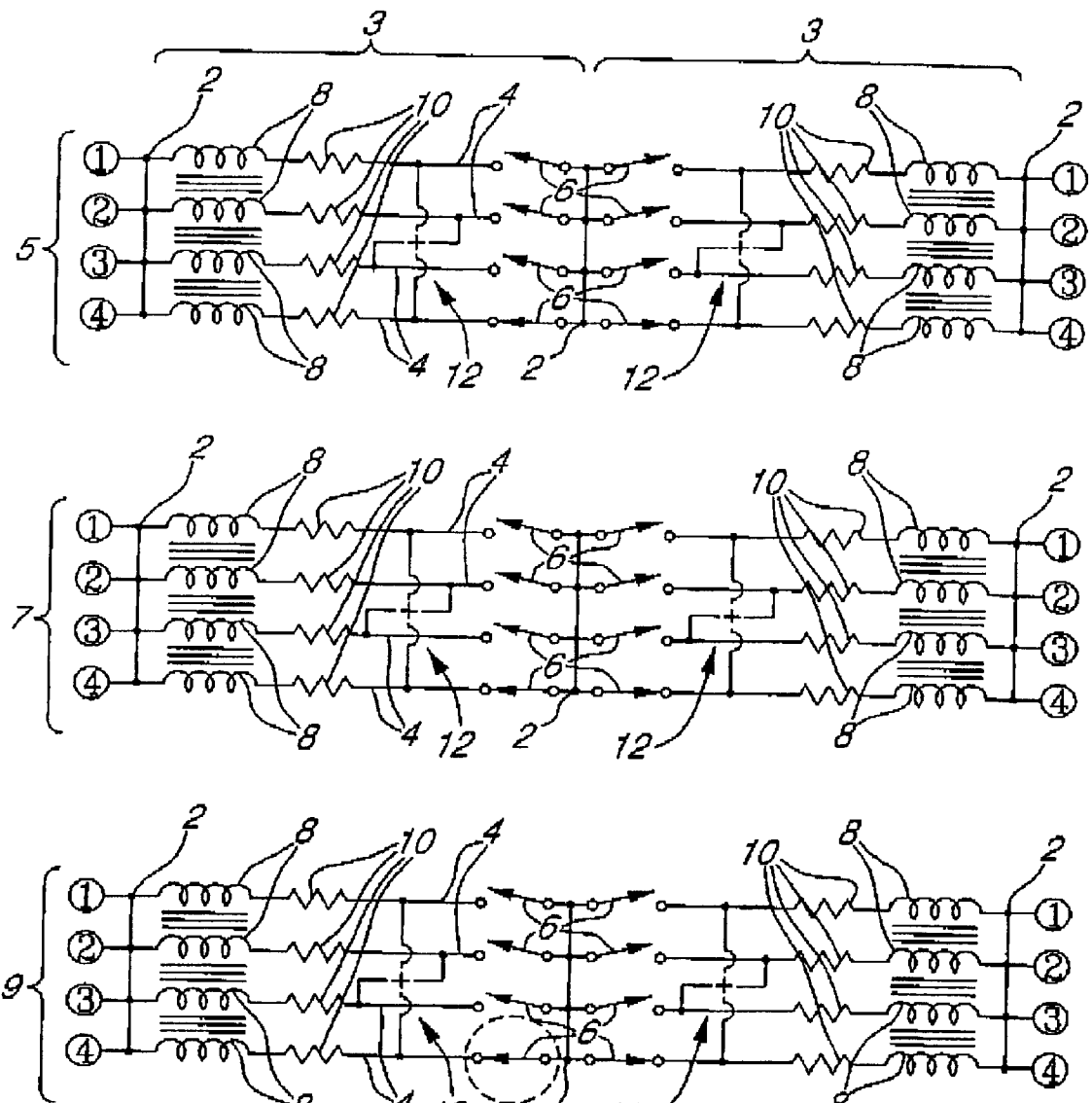
FIG. 10A is a schematic circuit diagram showing two segments of a three-phase line provided with switches for each bundle conductor of each segment according to the preferred embodiment.
FIG. 12A is a schematic diagram circuit of a pair of electromechanical and electronic switches according to one embodiment of the present invention.
Figures 10B, 12B:
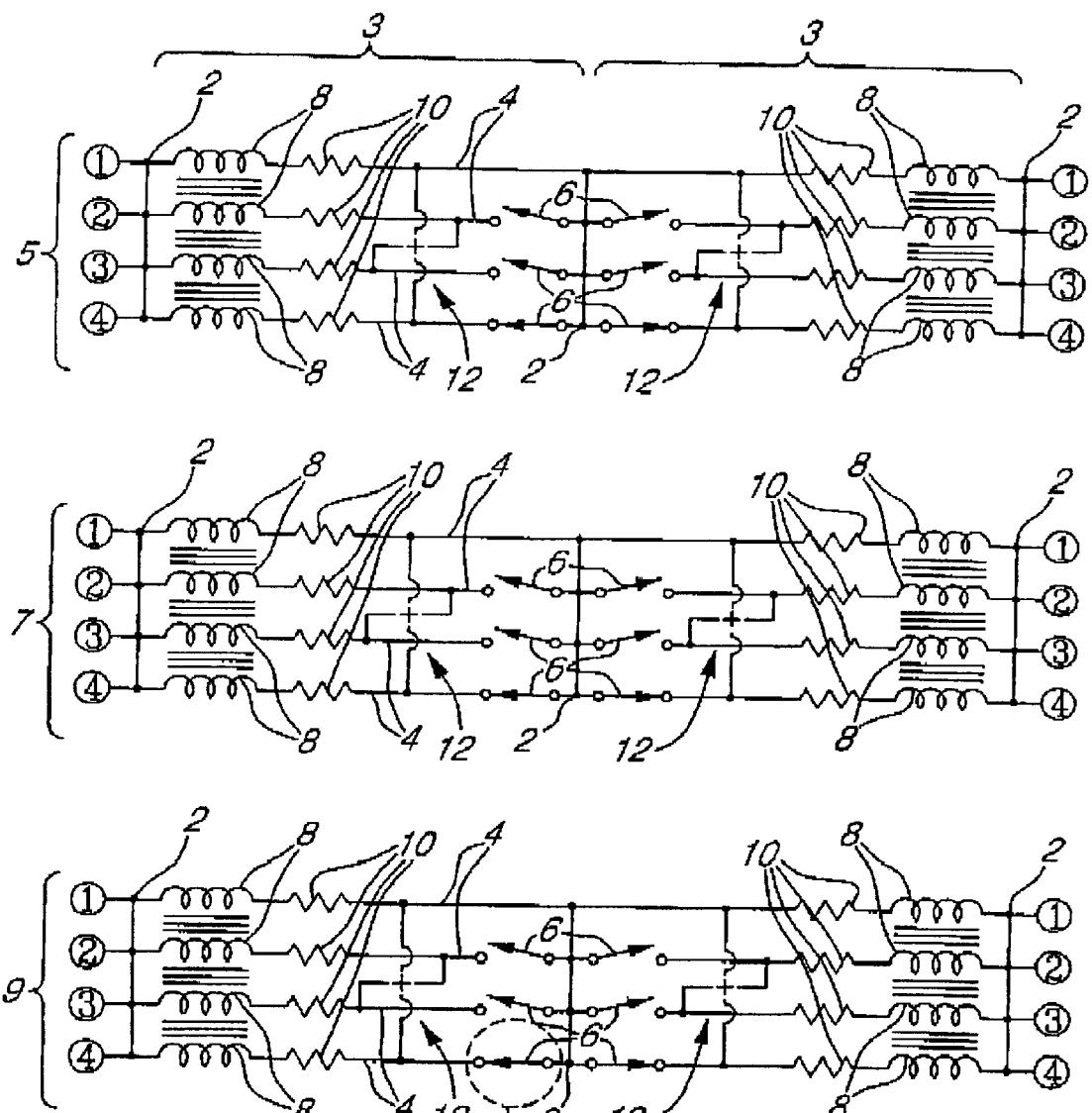
FIG. 10B is a schematic circuit diagram showing two segments of a three-phase line provided with switches for each bundle conductor less one of each segment according to an embodiment using only electronic switches.
FIG. 12B is a schematic diagram circuit of an electronic switch and protective elements according to one embodiment of the present invention.
Figure 12A:
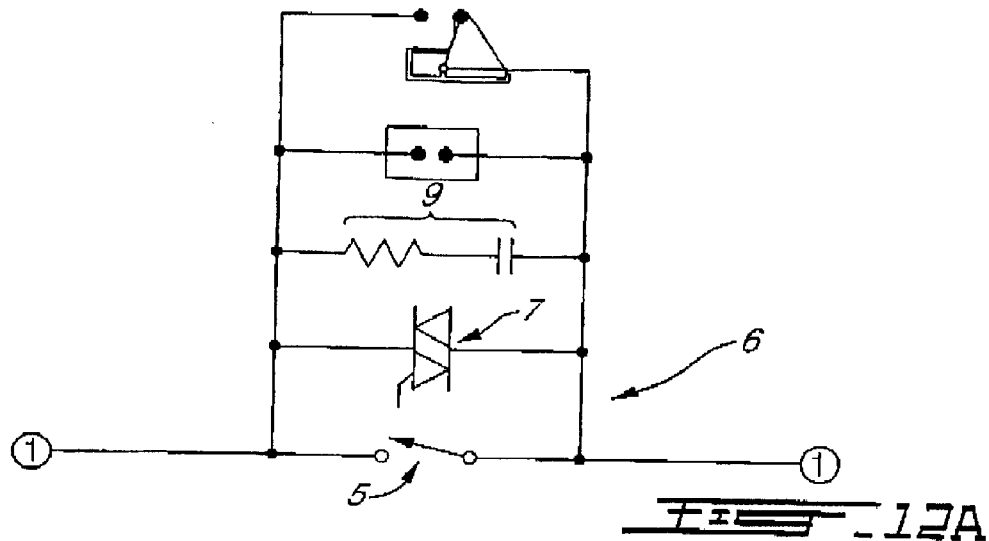
Figure 12B:
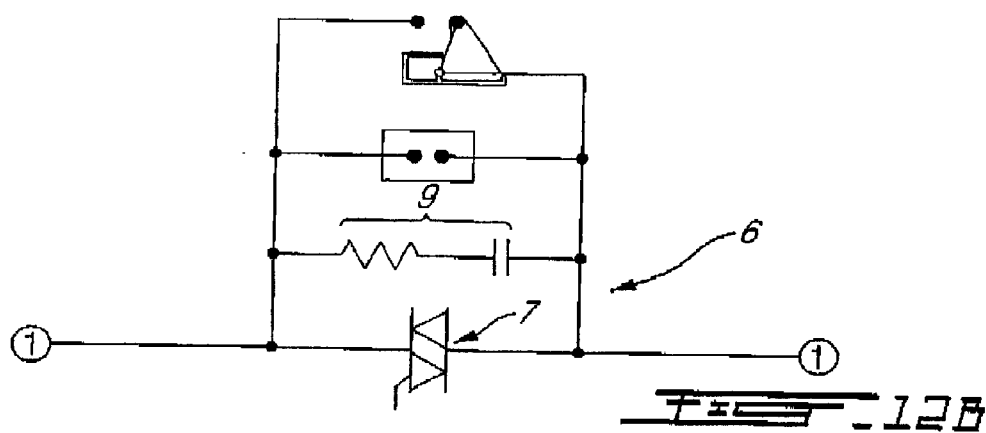

By referring now to figure 10A, one can see a part of a switching apparatus for a segment 3 of an electric power line according to the present invention. The electric power line can have several phase lines. In the present case, the electric power line has three phase lines 5, 7 and 9. Each of the phase lines 5, 7 and 9 has several conductors 4 electrically insulated one from the other for conducting the phase current. The conductors of each phase line are short-circuited among them at the two extremities of the segment 3 by short circuits 2. In FIG. 10A, all conductors are switched. This is useful particularly for de-icing purposes in which all of the current is concentrated in a single conductor to increase heating of the conductor. In FIG. 10B, one of the conductors is not switched. This is particularly useful when only power flow management without de-icing is desired, and the switching unit does not need to be provided with safety mechanisms to prevent an accidental open circuit.

The present invention can be used for managing the power flow in a segment of an electric power line by changing the series impedance of the line with the pairs of switches. For example, to change the power flow at the exit of a 735 kV power line fed by lines coming from distant dams, it suffices to modify the operating position of the pairs of switches of the switching device to modify the power flow. To that effect, one can permanently open electromechanical switches of predetermined pairs of switches associated to predetermined phase lines, and use the electronic switches of the predetermined pairs of switches for opening and closing the corresponding conductors and thus controlling in real time the power flow and stabilizing the electric network with a fine and active control. In addition to controlling impedance by opening phase line conductors, reactive components can be switched into the phase lines to decrease impedance of the phase line where necessary. By selectively switching reactive components and conductors of a bundle, the range of impedance modulation possible by the switching unit 25 within a line can be extended.

A change of impedance on different lines will produce a different power flow. There is a great number of possible combinations according to the state in which one places the different switches. The above-mentioned application proves to be very useful for carrying out an active stabilization of the network by dynamic control of the power flow.

In one embodiment, the apparatus according to the present invention comprises pairs of electromechanical and electric switches 6 connected in parallel, for selectively opening and closing the conductors 4 of each phase line 5, 7 or 9 so as to conduct the corresponding phase current through one or several conductors. The switches form part of the switching devices 26.

Each phase line has four conductors 4 and is provided with four pairs of switches 6. Furthermore, on each phase line, an equivalent circuit of inductors and mutual inductors of line 8, and of resistors of line 10 is indicated. For discussion purposes, one neglects the capacitive effects of the line. The pairs of switches 6 of a phase line with n conductors can pass a current in 1, 2, . . . or n conductors. For security reasons, the pairs of electromechanical and electronic switches are controlled so as to conduct the phase current of each phase line through at least one of the corresponding electromechanical switches so as to not open the line. Thus, the electromechanical switches of the pairs of switches 6 never all open simultaneously the n conductors of a phase line.

Spacers like the ones shown in FIG. 8 are provided for holding the conductors of a same phase line at a certain distance from each other between the towers. These spacers must be capable of electrically insulating the conductors of a same phase line from each other.

Yoke plates like the one shown in FIG. 9 are mounted on insulators of the towers and mechanically link the conductors to the insulators. These yoke plates must electrically insulate the conductors of a bundle from each other. Standard surge arrester 12 which can be semi-conductor voltage clamps, such as avalanching diodes, varistors or spark gaps, are intended for protecting the insulators from the yoke plates and from the spacers during a current overload of the line which could induce overvoltage between the conductors of the line phase.

Referring now to FIG. 12A, one can see a preferred embodiment of a pair of switches 6. This embodiment enables to protect the electronic and electromechanical switches 7 and 5. The electromechanical switch 5 is provided with a damper 9. When the pair of switches 6 must close, the electronic switch 7 closes before the mechanical switch, and when the switch 6 must open, the mechanical switch 5 opens before the electronic switch 7. The electronic switch 7 can be for example a thyristor, triac, GTO, MOSFET, IGBT, etc. In parallel to the electronic and electromechanical switches 7 and 5, a semiconductor voltage clamp, such as a spark gap, an avalanching diode or a varistor 50, has also been added to ensure the conduction in case of over-voltage and the protection of the switches. Furthermore, to ensure the continuity of the line in case of a major problem, a thermal spark gap device 52 is connected in parallel with the switches. As better illustrated in FIG. 11, this device 52 becomes short-circuited if sufficient energy is dissipated to melt the retaining wire 54 of the spring mechanism 56. When the spring mechanism is released, the mobile contact 58 is projected to contact the terminal 59.

Figure 12C:
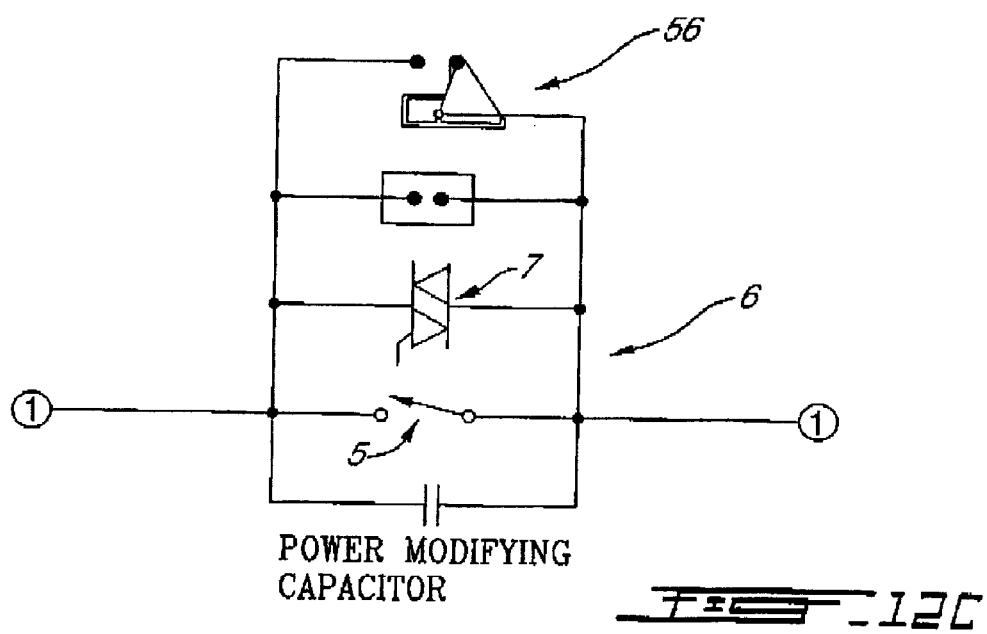
FIG. 12C is a schematic diagram circuit of an electronic switch, protective elements and an impedance regulating capacitor connected in parallel according to one embodiment of the present invention.

As shown in FIG. 12C, a power capacitor can be used to modulate impedance in an AC power transmission line. By opening switch 7, the current passes through the power capacitor. As mentioned, the impedance will vary as a function of the capacitance, and may increase or decrease based on the selected value. A variety of power regulating devices may be used alone or in combination according to the invention. Power resistors and/or conductors may be used in addition to capacitors. Different power regulating devices or combinations thereof may be used by switching such devices to form part of the conductor circuit.

In the embodiment of FIG. 11, the switch 6 comprises only an electronic switch 7 and the device 52 in parallel, which is similar to FIG. 12B. In the case that all phase line conductors are switchable, and the controller 24 should fail in maintaining at least one electronic switch 7 closed, device 52 may intervene to close the circuit path. Device 52 need not be provided on each conductor. Device 52 may additionally include switches that are activated by the actuation of the spring-loaded mechanism 46 to provide auxiliary gate signals for remaining electronic switches 7 of the group of conductors 4. It will be appreciated that it is desirable in the present invention to leave one conductor unswitched as in FIG. 10B so as to avoid the need for device 52 or an electromechanical switch having fixed physical states in which there is always a conduction path. However, in the application where all current is desirably passed through one conductor for efficient de-icing purposes, or where greater impedance control is desired, it is important to provide such security mechanisms.

In practice, the switching units 20 may be installed at a tower to switch the phase line conductors at both sides of the tower. As illustrated in FIGS. 10A and 10B, two separate transmission line spans or segments 3 can be controlled by switches 6 of different modules 25. Each span can be between about 20 to 35 km, meaning that each interface unit 22 communicates with six controllers 24 for every 40 to 70 km of modulated transmission line. One can see two adjacent line segments each provided with switches 6. For a given segment length, the switches 6 must be able to switch a given voltage value. The more the segment is long, the more the voltage that the switches 6 must switch and that the spacers and the yoke plates of the line segment must support, is high.

I claim:

1. A method of power flow management in an electrical power distribution network, the method comprising steps of:

providing at least one switching unit mounted to insulated portions of transmission line towers in proximity to at least one bundle conductor for opening and closing a current path in at least one of a plurality of conductors of said bundle to cause an impedance change modulating power flowing in at least one conductor of said at least one bundle conductor in an electric power transmission line at one or more segments in said network;

providing insulation between said conductors of said bundle so as to be able to withstand a voltage difference between said conductors caused by said switching unit in said segments; and managing the power flow in said segments by changing the series impedance of the line by controlling said at least one switching unit.

2. The method as defined in claim 1, wherein said step of managing comprises:

analyzing power flow in a plurality of electric power lines of said network;

determining a desired change in impedance for at least one of said plurality of electric power lines of said network;

controlling at least some of said switching units to implement said desired change in impedance.

3. The method as defined in claim 2, wherein said transmission line is an AC transmission line.

4. The method as defined in claim 3, wherein said step of controlling comprises transmitting a control signal to said switching units via a communications network.

5. The method as defined in claim 4, wherein said communications network is a wired network associated with said transmission line.

6. The method as defined in claim 4, wherein said communications network is a wireless network.

7. The method as defined in claim 4, wherein said control signal comprises a plurality of switching units commands addressed to specific ones of said switching units, said step of determining comprising selecting a combination of switching units and impedance change values expected to result in said desired change.

8. The method as defined in claim 7, wherein said series impedance change is a variable increase in impedance caused by opening current flow in one or more of said conductors, said combination of switching units and impedance change values being selected to reduce excess joule heating at points in said line.

9. The method as defined in claim 8, wherein said combination of switching units and impedance change values are changed periodically to yield the same desired impedance change while allowing said conductors to cool.

10. The method as defined in claim 4, wherein said switching units are provided at transmission towers in two groups for modulating impedance of two consecutive said segments from each tower, said two groups of switching units sharing a same communications interface.

11. The method as defined in claim 4, wherein said control signal is transmitted to communications interfaces at said towers, said communications interfaces communicating in turn with said switching units via a local wireless communications interface.

12. The method as defined in claim 4, wherein said switching unit comprises electronic switches, and said power flow managing is carried out in real time.

13. The method as defined in claim 2, wherein said series impedance change is a variable increase in impedance caused by opening one or more of said conductors.

14. The method as defined in claim 13, wherein one of said conductors is permanently left unswitched so as to conduct without modulation.

15. The method as defined in claim 13, wherein said switching units comprise electromechanical switching units having a plurality of switching states that prevent an open circuit as said switching states are changes.

16. The method as defined in claim 2, wherein one conductor of said conductors is permanently left unswitched, said at least one switching unit comprising electronic switches.

17. The method as defined in claim 2, wherein said switching units comprise electromechanical switching units having a plurality of switching states that prevent an open circuit as said switching states are changed.

18. The method as defined in claim 2, wherein said transmission line is a three-phase AC transmission line, said switching units controlling power flow in three phases of said line.

19. The method as defined in claim 1, wherein said switching units are provided at transmission towers in two groups for modulating impedance of two consecutive said segments from each tower.

* * * * *